(12) United States Patent
Herbold

(10) Patent No.: US 7,547,033 B1
(45) Date of Patent: Jun. 16, 2009

(54) CONVERTIBLE HITCH

(76) Inventor: Greg H. Herbold, 1257 Lenox Ave., Pierson, IA (US) 51048

( * ) Notice: Subject to any disclaimer, the term of this patent is extended or adjusted under 35 U.S.C. 154(b) by 376 days.

(21) Appl. No.: 11/332,629

(22) Filed: Jan. 13, 2006

(51) Int. Cl.
*B60D 1/14* (2006.01)
*A01B 73/04* (2006.01)

(52) U.S. Cl. .................. 280/416.2; 172/248

(58) Field of Classification Search .......... 280/416.2; 172/248, 439
See application file for complete search history.

(56) References Cited

U.S. PATENT DOCUMENTS

| | | | |
|---|---|---|---|
| 2,341,807 A * | 2/1944 | Olmstead et al. | 280/446.1 |
| 3,093,394 A * | 6/1963 | McCollum | 280/416.2 |
| 3,980,232 A * | 9/1976 | Funk | 239/77 |
| 4,145,085 A * | 3/1979 | Taber et al. | 298/5 |
| 5,267,747 A | 12/1993 | Thorn | 280/416.2 |
| 5,807,053 A * | 9/1998 | Pride | 414/24.5 |

FOREIGN PATENT DOCUMENTS

GB  2203322 A  * 10/1988

* cited by examiner

*Primary Examiner*—Paul N Dickson
*Assistant Examiner*—Daniel Yeagley
(74) *Attorney, Agent, or Firm*—Dennis L. Thomte; Thomte Patent Law Office LLC

(57) ABSTRACT

A convertible hitch for use on an agricultural implement or the like which is convertible from a three-point hitch to a tongue-type hitch and vice versa.

2 Claims, 6 Drawing Sheets

CONVERTIBLE HITCH

BACKGROUND OF THE INVENTION

1. Field of the Invention

This invention relates to a convertible hitch which may be converted from a three-point hitch to a tongue-type hitch and vice versa.

2. Description of the Related Art

Many farm tractors and all-terrain vehicles (ATVs) have three-point hitches thereon while others have drawbars or some other hitch arrangement which may accommodate ball hitches, clevis hitches, etc. Further, some agricultural implements such as sprayers or the like may have three-point hitches thereon or may have tongue-type hitches thereon which means that some tractors or ATVs may be attached to some implements but are unable to be attached to other implements since the hitches on the vehicles and the implements are not complementary. Therefore, there is a need for a convertible hitch which may be easily switched from a three-point hitch to a tongue-type hitch and vice versa.

SUMMARY OF THE INVENTION

The convertible hitch of this invention is designed to be mounted on the forward end of a wheeled frame such as commonly found on an agricultural sprayer or the like. Although the drawings illustrate an agricultural sprayer, the convertible hitch of this invention may be used with other types of implements. The convertible hitch includes an elongated, transversely extending, horizontally disposed first frame member, having first and second ends, which are pivotally secured to the forward end of the wheeled frame about a horizontal axis. An elongated second frame member, having first and second ends, is rigidly secured at its said one end to the first frame member at the center length thereof and extends therefrom in a transverse manner. The first frame member is selectively pivotally movable between first and second positions.

The second frame member extends upwardly from the first frame member when the first frame member is in its first position and extends forwardly from the first frame member when the first frame member is in its second position. A tow hitch member is secured to the second end of the second frame member. First and second point hitches are secured to the first frame member in a horizontally spaced-apart relationship. A third point hitch is secured to the second frame member. The first, second and third point hitches are adapted to be secured to a vehicle three-point hitch assembly when the first frame member is in its first position. The tow hitch member is adapted to be selectively secured to a towing vehicle when the first frame member is in its second position. A locking means is provided which locks the first frame member in its first and second positions.

In a second embodiment, the first frame member is not pivotally mounted on the wheeled frame, but is rigidly secured thereto. In the second embodiment, the second frame member is pivotally secured with respect to the first frame member with the second frame member being movable between first and second positions. When the second frame member in the second embodiment is in its first position, the hitch serves as a three-point hitch. When the second frame member is in its second position, the hitch serves as a tongue-type hitch. Means is also included in the second embodiment for locking or maintaining the second frame member in its first and second positions.

A third embodiment is also disclosed which is somewhat similar to the second embodiment. In the third embodiment, the second frame member is omitted and a forwardly presented receiver is secured to the center of the first frame member which is adapted to receive the rearward end of a hitch when the hitch serves as a tongue-type hitch.

It is therefore a principal object of the invention to provide a convertible hitch.

A further object of the invention is to provide a convertible hitch which may be switched between a three-point hitch and a tongue-type hitch and vice versa.

Still another object of the invention is to provide a convertible hitch which may be either connected to the three-point hitch of a tractor or to a quick attach mechanism mounted on the three-point hitch of the tractor.

A further object of the invention is to provide a convertible hitch which may be secured to agricultural implements with a minimum of alteration thereto.

These and other objects will be apparent to those skilled in the art.

DETAILED DESCRIPTION OF THE INVENTION

Figure 1:
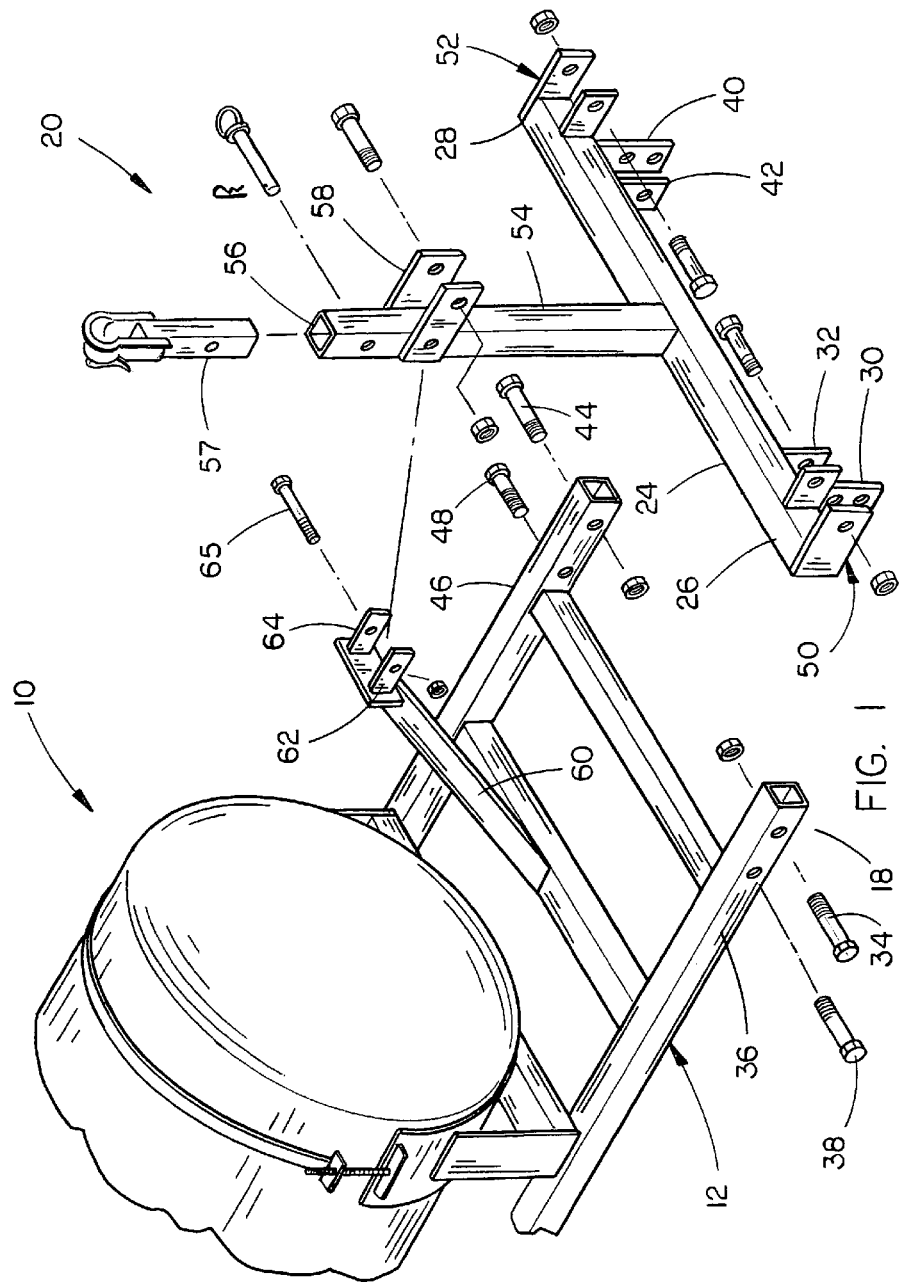
FIG. 1 is an exploded perspective view of the convertible hitch of this invention.
Figure 2:
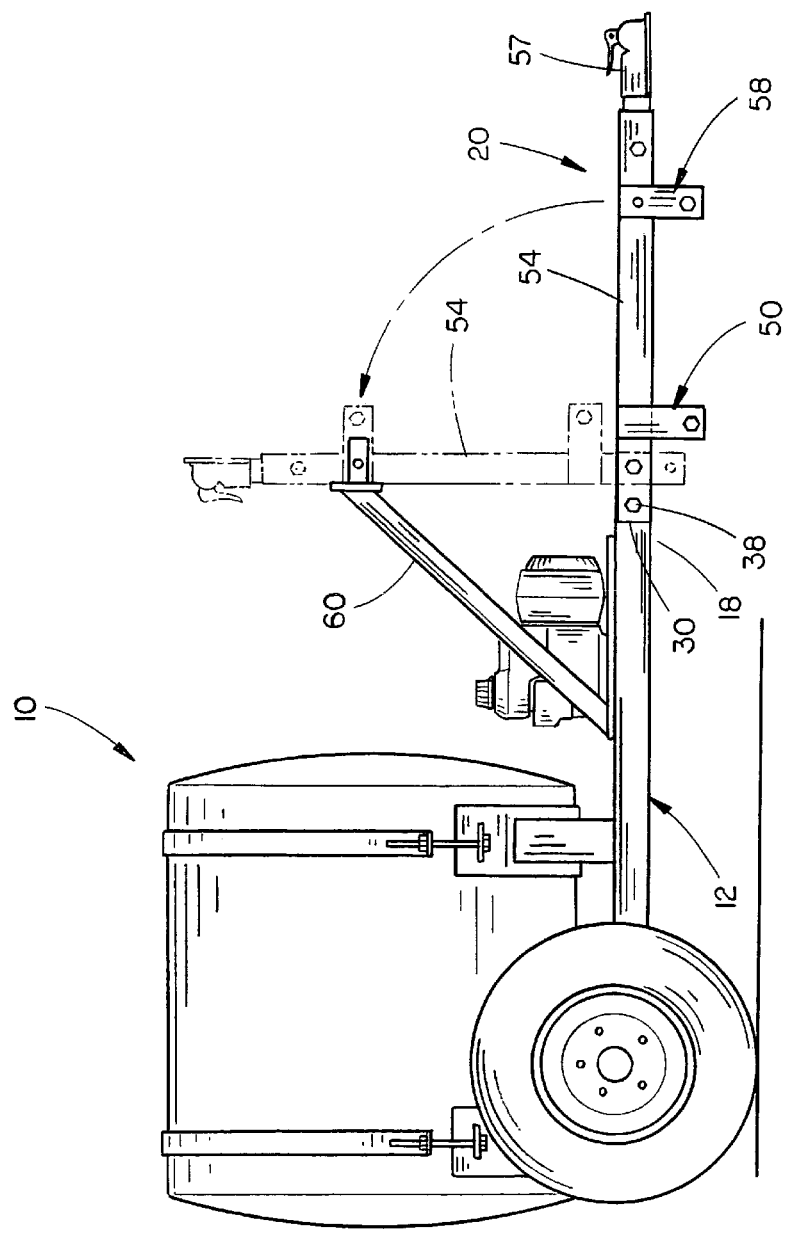
FIG. 2 is a side view of the hitch of this invention with the broken lines illustrating the hitch in a three-point configuration.
Figure 3:
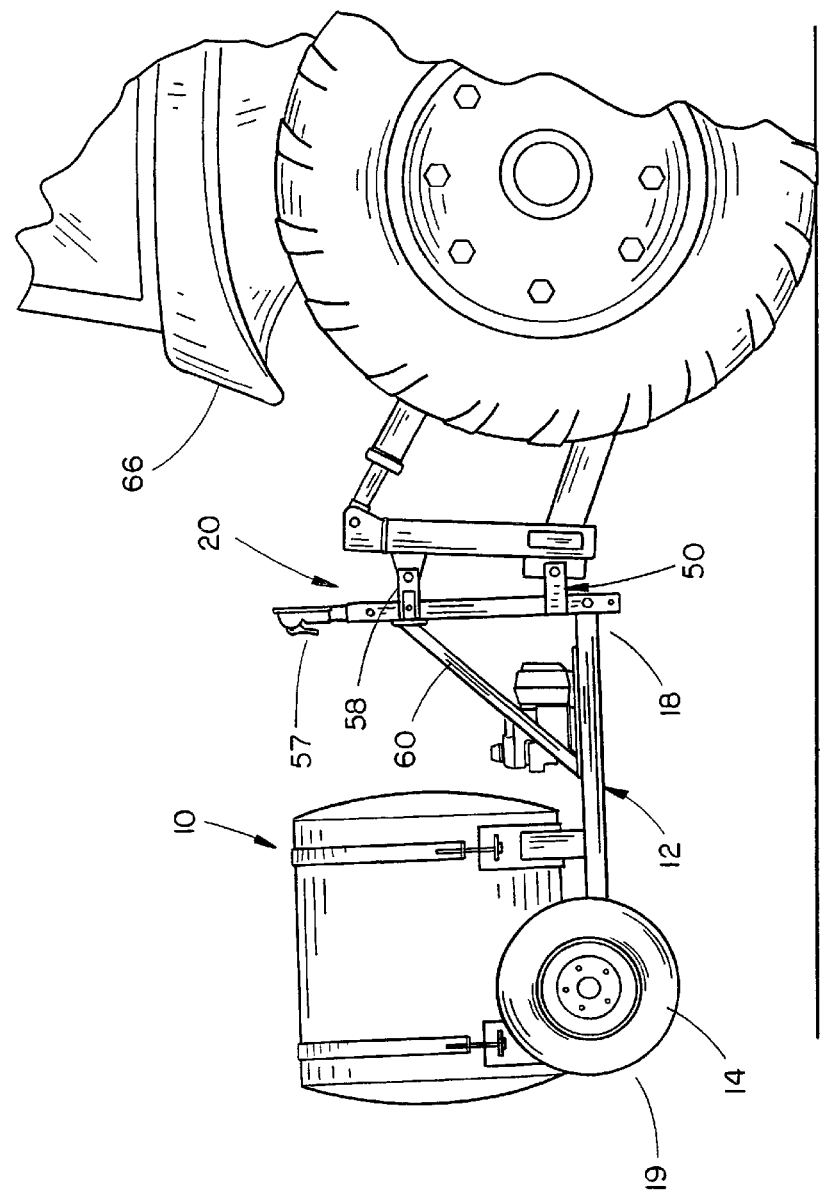
FIG. 3 is a side view illustrating the hitch in its three-point configuration with the wheeled frame being lifted from the ground.
Figure 4:
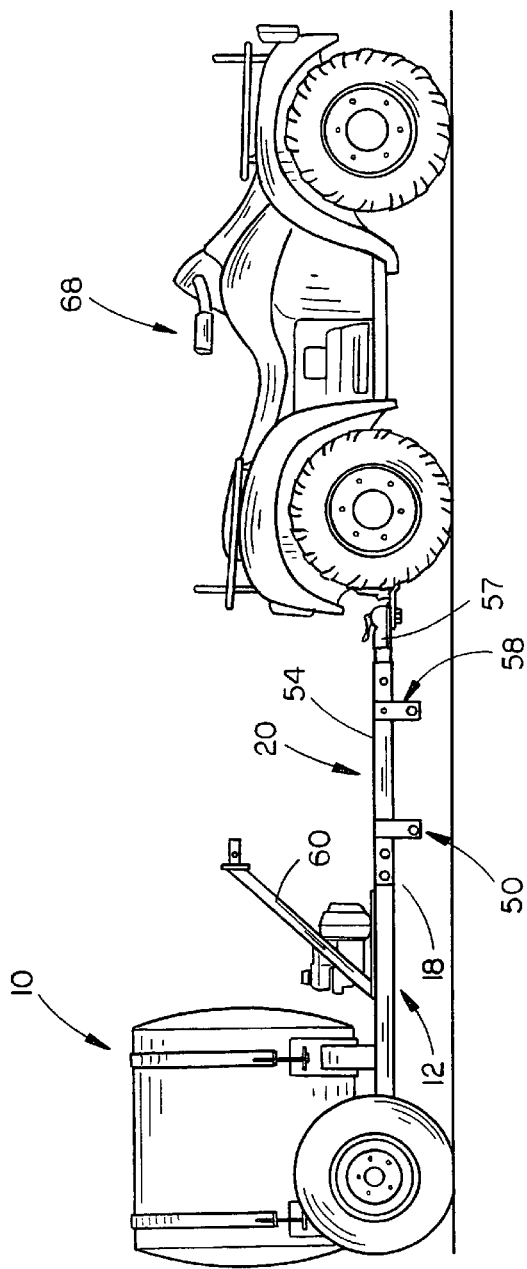
FIG. 4 is a side view of the hitch wherein the second frame member functions as a tongue.

In the drawings, the numeral 10 refers to an agricultural implement such as a sprayer or the like. Implement 10 includes a wheeled frame 12 having wheels 14 mounted on the opposite ends of an axle or mounted on individual spindles in conventional fashion. For purposes of description, the wheeled frame 12 will be described as having a forward end 18 and rearward end 19.

The numeral 20 refers generally to the convertible hitch of this invention which is mounted on the forward end of the wheeled frame 12. In the embodiment of FIGS. 1-4, convertible hitch 20 includes a first elongated, horizontally disposed and transversely extending frame member 24 having ends 26 and 28, respectively. A pair of spaced-apart plates 30 and 32 are welded to one side of frame member 24 inwardly of end 26 and extend transversely therefrom. Bolt or pin 34 extends through plates 30 and 32 and the forwardly extending frame member 36 on wheeled frame 12. Plate 30 is longer than plate 32 so that a bolt or pin 38 may be extended through plate 30 and through the frame member 36 so lock or maintain frame member 24 in its second position, as will be described hereinafter. Similarly, plates 40, 42, bolt or pin 44, and bolt or pin 48 is provided at the other end of frame member 24 to pivotally secure frame member 24 to frame member 46 on wheeled frame 12.

First and second point hitches 50 and 52 are provided at the opposite ends of frame member 24 and extend forwardly therefrom when frame member 24 is in its first position, as will be described hereinafter. In the embodiment of FIGS. 1-4, a second frame member 54 is welded at one end thereof to the center of frame member 24 in a transversely extending relationship, as seen in the drawings. Second frame member 54 is provided with a receiver 56 at its other end which is adapted to receive different types of tow hitches 57 such as ball hitches, clevis hitches, pin hitches, etc. A three point hitch 58 is secured to frame member 54, as seen in the drawings, and extends forwardly therefrom when the frame member 54 is in its vertically disposed position with the frame member 24 being in its first position.

Brace 60 is secured at one end thereof to the wheeled frame 12 and extends upwardly and forwardly therefrom and has a pair of bars or brackets 62 and 64 extending forwardly therefrom which are adapted to receive the three-point hitch 58 and the frame member 54 therebetween. Bolt or pin 65 is selectively extended through the bars 62, 64, the three-point hitch 58 and the second frame member 54, as illustrated in the drawings. When the bolt or pin 65 is so positioned, the first frame member 24 is maintained in its first position so that the three-point hitches 50, 52, 58 on the frame member 24 and the frame member 54 are presented forwardly. The first frame member 24 may be locked in its second position by means of a bolt or pin 38 extending through plates 30 and 32 and the frame member 36 and a bolt or pin 48 extending through plates 40, 42 and frame member 46.

When the frame member 24 is in its first position (FIG. 3), the frame member 54 is locked into the bars 62, 64 so that the forwardly presented three-point hitches are presented forwardly for attachment to the three-point hitch assembly of a tractor 66 or ATV so that the implement may be raised and lowered with respect to the ground. When the frame member 24 is in its second position (FIG. 4), the frame member 54 serves as a tongue and the receiver 56 thereon may have any type of tow hitches 57 mounted therein to accommodate the particular hitch arrangement on the tractor 66 or ATV 68. The wheeled frame 12 is of the single axle type, and when the frame member 24 is in its second position, it is important that the frame member be locked into that position by the bolts or pins 38 and 48 to prevent the forward end of the wheeled frame from simply pivoting downwardly into contact with the ground.

Figure 5:
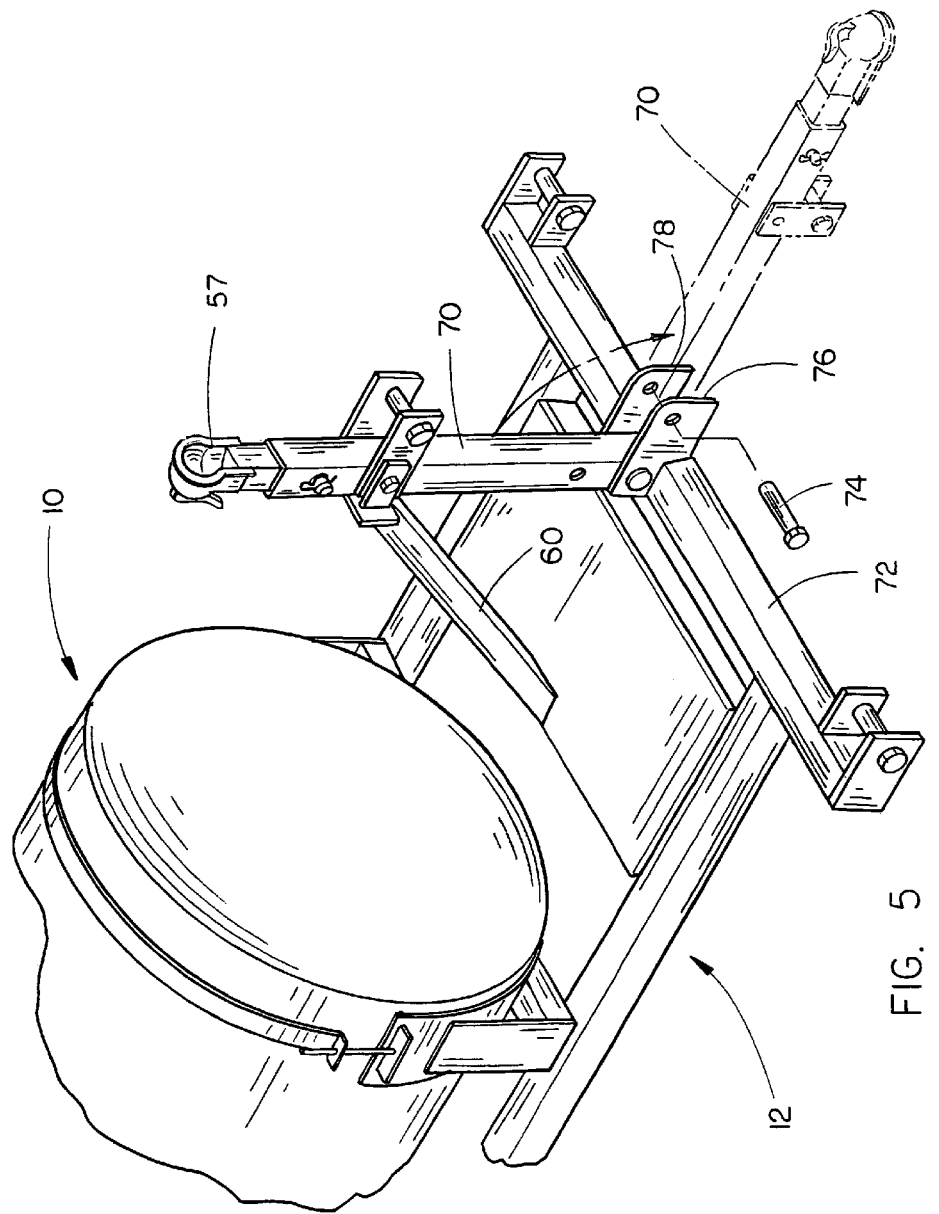
FIG. 5 is a perspective view of a second embodiment of the invention.

FIG. 5 illustrates a modified form of the invention with the only difference being that the frame member 70, which corresponds to frame member 54 in the first embodiment, is pivotally secured to the first frame member 72, which corresponds to first frame member 24 in the first embodiment, with the frame member 72 being fixed to the wheeled frame of the implement. In the embodiment of FIG. 5, the frame member 70 is shown to be in its fixed upright position so that the hitch may function as a three-point hitch by means of hitch points 50, 52 and 58. When the frame member 70 is pivoted to the position shown by broken lines in FIG. 5, the member 70 serves as a tongue-type hitch. The frame member 70 is locked into the position illustrated by broken lines by means of a bolt or pin 74 which may be extended through plates 76 and 78 and the frame member 70. Plates 76 and 78 are welded to the inner ends of the frame member 72 which is of two-piece construction.

Figure 6:
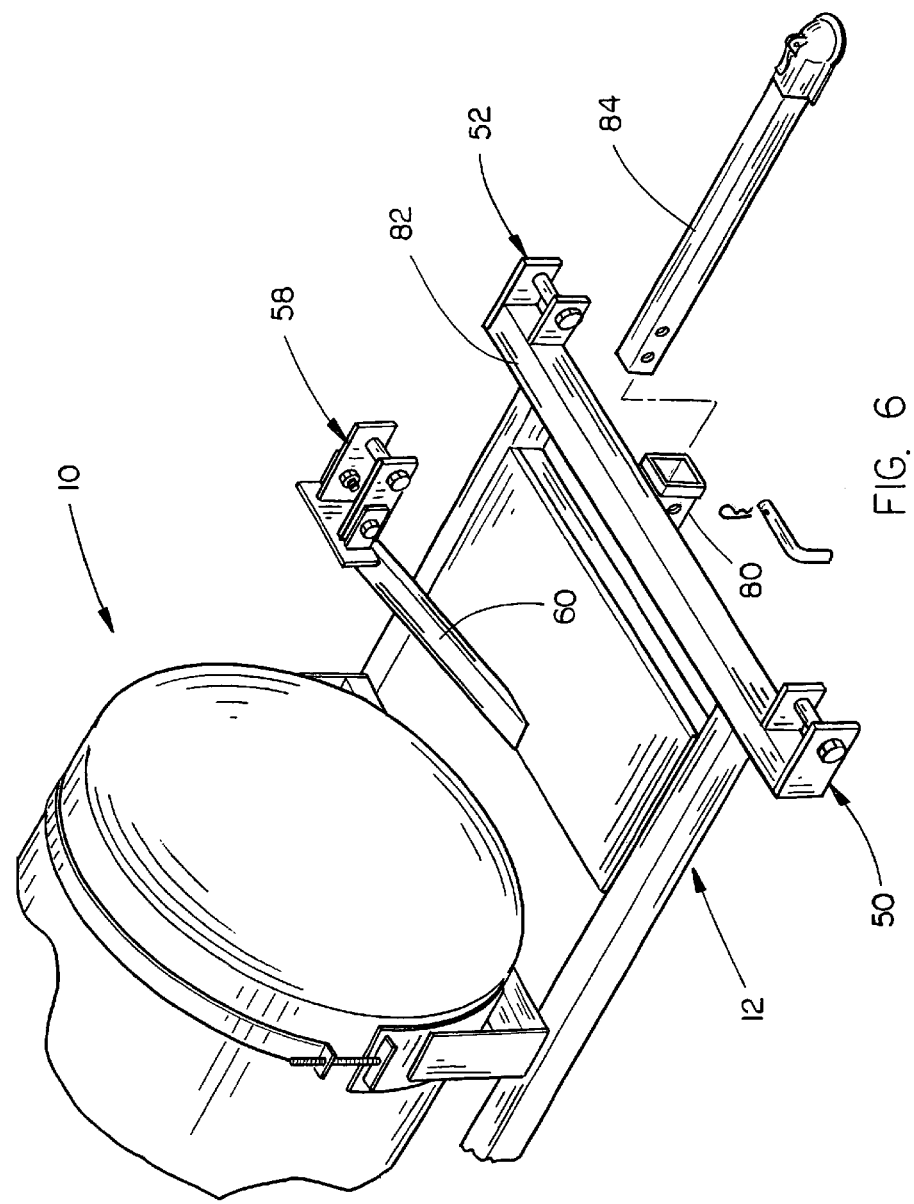
FIG. 6 is an exploded perspective view of a third embodiment of the invention.

FIG. 6 illustrates a third embodiment of the invention which is generally similar to the embodiment of FIG. 5. The primary difference between the embodiment of FIG. 6 and that of FIG. 5 is that a forwardly presented receiver 80 is secured to the first frame member 82 and which is adapted to receive removably tongue-type hitch 84 therein when the embodiment is being used as a tongue hitch. When the hitch is used as a three-point hitch, the hitch 84 is removed from the receiver 80 and the hitch points 50, 52 and 58 are utilized.

Thus it can be seen that as unique convertible hitch has been illustrated and described which enables a hitch to be converted from a three-point hitch to a tongue-type hitch and vice versa.

Thus it can be seen that the invention accomplishes at least all of its stated objectives.

I claim:

1. In combination:
a wheeled frame having forward and rearward ends;
an elongated, transversely extending, horizontally disposed first frame member, having first and second ends, pivotally secured to said forward end of said wheeled frame about a horizontal axis;
an elongated second frame member having first and second ends, said first end of said second frame member being rigidly secured to said first frame member at a center length of said first frame member and extending therefrom in a transverse manner;
said first frame member being selectively pivotally movable between first and second positions;
said second frame member extending upwardly from said first frame member when said first frame member is in said first position;
said second frame member extending forwardly from said first frame member when said first frame member is in said second position;
a tow hitch member selectively removably secured to said second end of said second frame member;
a first point hitch secured to said first frame member adjacent said first end thereof;
a second point hitch secured to said first frame member adjacent said second end thereof in a horizontally-spaced relationship to said first point hitch;
a third point hitch secured to said second frame member adjacent said second end thereof;
said first, second and third point hitches adapted to be secured to a vehicle three-point hitch assembly when said first frame member is in said first position;
said tow hitch member adapted to be selectively secured to a towing vehicle when said first frame member is in said second position;
said first frame member being selectively locked in said first and second positions.

2. The combination of claim 1 wherein an elongated tubular receiver is provided at the said second end of said second frame member and wherein said tow hitch member is selectively received by and secured to said receiver.

* * * * *